United States Patent
Goebel

(10) Patent No.: US 7,935,455 B2
(45) Date of Patent: May 3, 2011

(54) BALANCED HYDROGEN FEED FOR A FUEL CELL

(75) Inventor: Steven G. Goebel, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1201 days.

(21) Appl. No.: 11/363,343

(22) Filed: Feb. 27, 2006

(65) Prior Publication Data

US 2007/0202383 A1    Aug. 30, 2007

(51) Int. Cl.
*H01M 8/02* (2006.01)
*H01M 8/04* (2006.01)
(52) U.S. Cl. .......................... 429/514; 429/457
(58) Field of Classification Search .......... None
See application file for complete search history.

(56) References Cited

U.S. PATENT DOCUMENTS

| 5,763,113 | A | 6/1998 | Meltser et al. |
| 5,776,624 | A | 7/1998 | Neutzler |
| 6,099,984 | A | 8/2000 | Rock |
| 6,503,653 | B2 | 1/2003 | Rock |
| 6,936,362 | B2 | 8/2005 | Chapman et al. |
| 6,974,648 | B2 | 12/2005 | Goebel |
| 7,479,341 | B2 * | 1/2009 | Takeguchi et al. ............. 429/34 |
| 2004/0209150 | A1 | 10/2004 | Rock et al. |
| 2005/0064263 | A1 | 3/2005 | Goebel et al. |
| 2005/0260471 | A1 | 11/2005 | Logan et al. |
| 2006/0134474 | A1 * | 6/2006 | Toth .............................. 429/17 |

* cited by examiner

*Primary Examiner* — John S Maples
(74) *Attorney, Agent, or Firm* — Fraser Clemens Martin & Miller LLC; J. Douglas Miller

(57) ABSTRACT

A system and method of balancing a hydrogen feed for a fuel cell to optimize flow of hydrogen through the fuel cell, wherein a pressure drop through parallel feed channels and active area channels of the fuel cell is balanced.

5 Claims, 4 Drawing Sheets

BALANCED HYDROGEN FEED FOR A FUEL CELL

FIELD OF THE INVENTION

The invention relates to a fuel cell and more particularly to a system and method of balancing a hydrogen feed for the fuel cell to optimize flow of hydrogen through the fuel cell.

BACKGROUND OF THE INVENTION

Fuel cell systems are increasingly being used as a power source in a wide variety of applications. Fuel cell systems have been proposed for use in power consumers such as vehicles as a replacement for internal combustion engines, for example. Such a system is disclosed in commonly owned U.S. patent application Ser. No. 10/418,536, hereby incorporated herein by reference in its entirety. Fuel cells may also be used as stationary electric power plants in buildings and residences, as portable power in video cameras, computers, and the like. Typically, the fuel cells generate electricity used to charge batteries or to provide power for an electric motor.

Fuel cells are electrochemical devices which directly combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

The basic process employed by a fuel cell is efficient, substantially pollution-free, quiet, free from moving parts (other than an air compressor, cooling fans, pumps and actuators), and may be constructed to leave only heat and water as by-products. The term "fuel cell" is typically used to refer to either a single cell or a plurality of cells depending upon the context in which it is used. The plurality of cells is typically bundled together and arranged to form a stack with the plurality of cells commonly arranged in electrical series. Since single fuel cells can be assembled into stacks of varying sizes, systems can be designed to produce a desired energy output level providing flexibility of design for different applications.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" diffusion mediums (hereinafter "DM's") or diffusion layers that are formed from a resilient, conductive, and gas permeable material such as carbon fabric or paper. The DM's serve as the primary current collectors for the anode and cathode as well as provide mechanical support for the MEA. The DM's and MEA are pressed between a pair of electronically conductive plates which serve as secondary current collectors for collecting the current from the primary current collectors. The plates conduct current between adjacent cells internally of the stack in the case of bipolar plates and conduct current externally of the stack (in the case of monopolar plates at the end of the stack).

The secondary current collector plates each contain at least one active region that distributes the gaseous reactants over the major faces of the anode and cathode. These active regions, also known as flow fields, typically include a plurality of lands which engage the primary current collector and define a plurality of grooves or flow channels therebetween. The channels supply the hydrogen and the oxygen to the electrodes on either side of the PEM. In particular, the hydrogen flows through the channels to the anode where the catalyst promotes separation into protons and electrons. On the opposite side of the PEM, the oxygen flows through the channels to the cathode where the oxygen attracts the hydrogen protons through the PEM. The electrons are captured as useful energy through an external circuit and are combined with the protons and oxygen to produce water vapor at the cathode side.

When laying out a pattern for the flow field, it is desirable to have all of the flow channels the same length to balance the flow amongst the channels for uniform distribution of reactant flow, as a first approximation. In some flow fields, however, it is desirable to branch channels or to connect channels in an active area to fewer feed channels to allow smaller headers for smaller overall stack size. In other flow field designs, the feed channels may be positioned outside of the active area of the flow field since the DM has been removed from these regions to allow nesting of the plate halves for a smaller overall stack size. In this case, the feed channels may or may not be branched.

In the above configurations, uniform channel lengths do not provide uniform reactant distribution for the anode when hydrogen is used. For hydrogen anode flow, there is a significant change in volume from inlet to outlet as the hydrogen gas is consumed within the active area of the fuel cell. The flow will be unevenly distributed with more flow on one side of the flow field. The volume flow is greater in the inlet branched or non-active channels, so more pressure drop occurs in these channels per length than for the outlet branched or non-active channels. Therefore, for channels on a side which have a longer inlet feed channel length, the flow will be reduced compared to channels on the opposite side which have longer outlet channel lengths.

It would be desirable to produce a plate for a fuel cell wherein a hydrogen feed is balanced to optimize flow of hydrogen through the fuel cell.

SUMMARY OF THE INVENTION

Consistent and consonant with the present invention, a plate for a fuel cell wherein a hydrogen feed is balanced to optimize flow of hydrogen through the fuel cell, has surprisingly been discovered.

In one embodiment, the plate comprises a plate having a flow field formed therein, the flow field defined by a plurality of channels formed on an outer surface thereof, the channels of the flow field adapted to provide communication between a source of gas and an exhaust header; and an active region of the flow field including at least a portion of the channels, the active region including a diffusion medium adjacent thereto, at least a portion of the gas consumed in the active region to cause a difference in volumetric flow of the gas upstream of the active region and downstream of the active region, wherein at least a portion of the channels includes a branched section forming a plurality of branched channels to facilitate a balancing of a flow of the gas therethrough.

In another embodiment, the plate comprises a plate having a first side and a second side; and a flow field formed in a first side of the plate, the flow field further comprising an inlet feed region; an outlet feed region; a plurality of inlet flow channels formed in the inlet feed region on an outer surface of the plate in communication with a source of gas; a plurality of outlet flow channels formed in the outlet feed region on an outer surface of the plate in communication with an exhaust header;

a plurality of intermediate flow channels formed in the flow field providing communication between the inlet flow channels and the outlet flow channels; and an active region including at least a portion of the intermediate flow channels, the active region including a diffusion medium adjacent thereto, at least a portion of the gas consumed in the active region to cause a difference in flow of the gas through the inlet flow channels and the outlet flow channels, wherein at least one of the inlet flow channels communicates with at least two of the intermediate flow channels and at least one of the outlet flow channels communicates with at least two of the intermediate flow channels to facilitate a balancing of a flow of the gas through the flow field.

The invention also provides methods of balancing fuel flow through a flow field in a fuel cell.

In one embodiment, the method of balancing fuel flow through a flow field in a fuel cell comprises the steps of providing a plate having the flow field formed therein, the flow field defined by a plurality of channels formed on an outer surface of the plate; providing a source of gas, wherein the channels provide communication between a source of gas and an exhaust header; providing a diffusion medium adjacent at least a portion of the channels to form an active region of the flow field, wherein at least a portion of the gas is consumed in the active region to cause a difference in volumetric flow of the gas upstream of the active region and downstream of the active region; providing a branched section in at least a portion of the channels, the branched section including a plurality of branched channels; and positioning the branched channels in desired ones of the channels to facilitate a balancing of a flow of the gas through the flow field.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
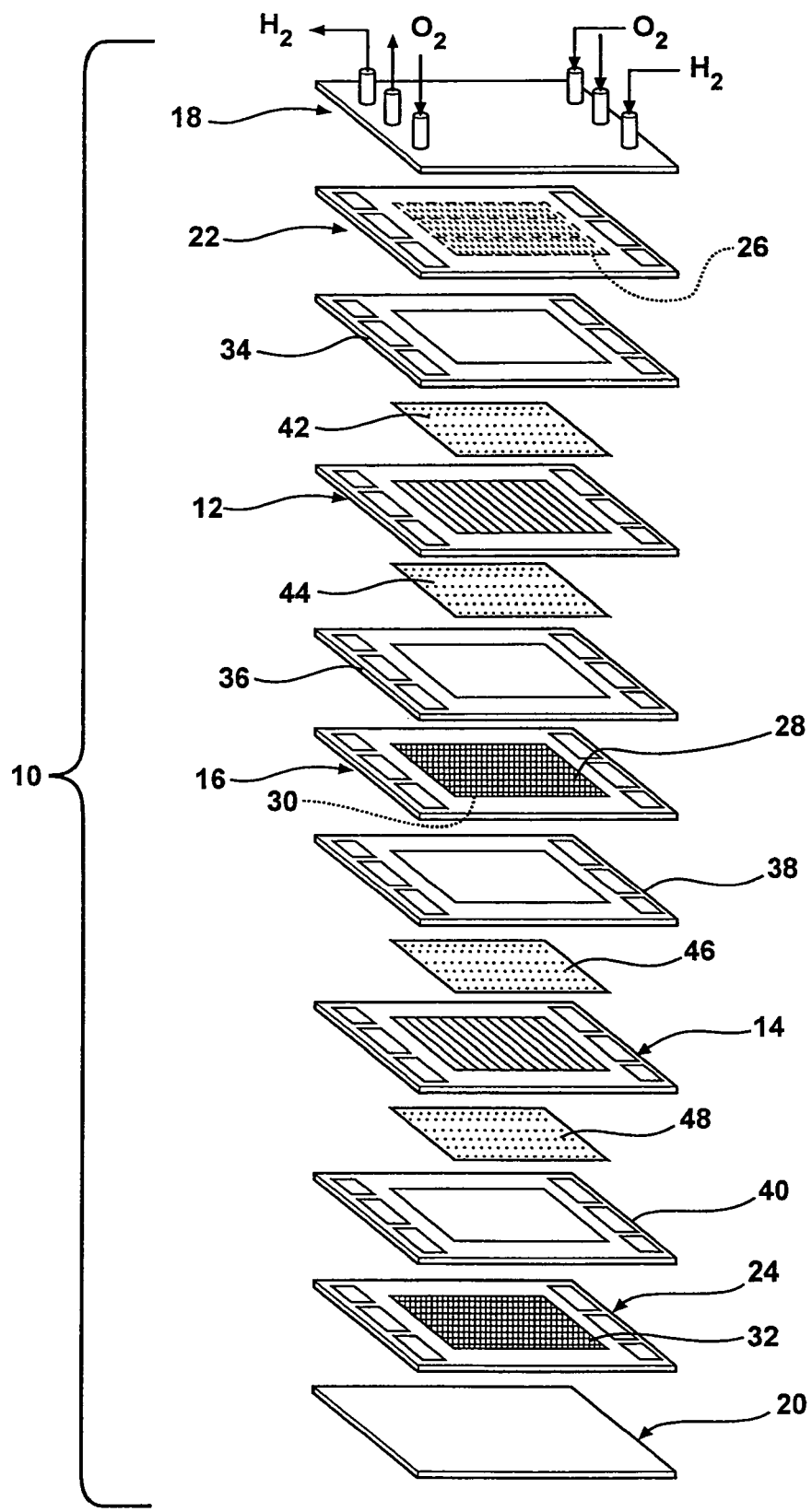
FIG. 1 is an exploded perspective view of a fuel cell stack.

FIG. 1 shows a two-cell bipolar PEM fuel cell stack 10. Although a bipolar PEM fuel cell stack is shown, it is understood that other fuel cell types and configurations can be used without departing from the scope and spirit of the invention. It is also understood that fuel cell stacks having more cells and plates can be and typically are used.

The fuel cell stack 10 includes a first membrane-electrode-assembly (MEA) 12 and a second membrane-electrode assembly 14. An electrically conductive, liquid-cooled, bipolar plate 16 is disposed between the first MEA 12 and the second MEA 14. The first MEA 12, the second MEA 14, and the bipolar plate 16 are stacked together between clamping plates 18, 20 and monopolar end plates 22, 24. The clamping plates 18, 20 are electrically insulated from the monopolar end plates 22, 24.

A working face of each of the monopolar end plates 22, 24, as well as both working faces of the bipolar plate 16 include a plurality of grooves or channels 26, 28, 30, 32 formed therein. The channels 26, 28, 30, 32 define a so-called "flow field" for distributing a fuel and an oxidant gas over the faces of the MEA's 12, 14. In the embodiment described herein, the fuel is hydrogen and the oxidant is oxygen, although it is understood that other fuels and oxidants can be used as desired.

Nonconductive gaskets 34, 36, 38, 40 are respectively disposed between the monopolar end plate 22 and the first MEA 12, the first MEA 12 and the bipolar plate 16, the bipolar plate 16 and the second MEA 14, and the second MEA 14 and the monopolar end plate 24. The gaskets 34, 36, 38, 40 provide a seal and electrically insulate the monopolar end plate 22 and the first MEA 12, the first MEA 12 and the bipolar plate 16, the bipolar plate 16 and the second MEA 14, and the second MEA 14 and the monopolar end plate 24.

Gas-permeable diffusion media 42, 44, 46, 48 abut respective electrode faces of the first MEA 12 and the second MEA 14. The diffusion media 42, 44, 46, 48 are respectively disposed between the monopolar end plate 22 and the first MEA 12, the first MEA 12 and the bipolar plate 16, the bipolar plate 16 and the second MEA 14, and the second MEA 14 and the monopolar end plate 24.

The bipolar plate 16 is typically formed from an anode plate (not shown) and a cathode plate (not shown). The anode plate and the cathode plate are bonded together to form a coolant chamber therebetween. The channel 28 is formed in the anode plate and channel 30 is formed in the cathode plate to form the respective flow fields.

Figure 2:
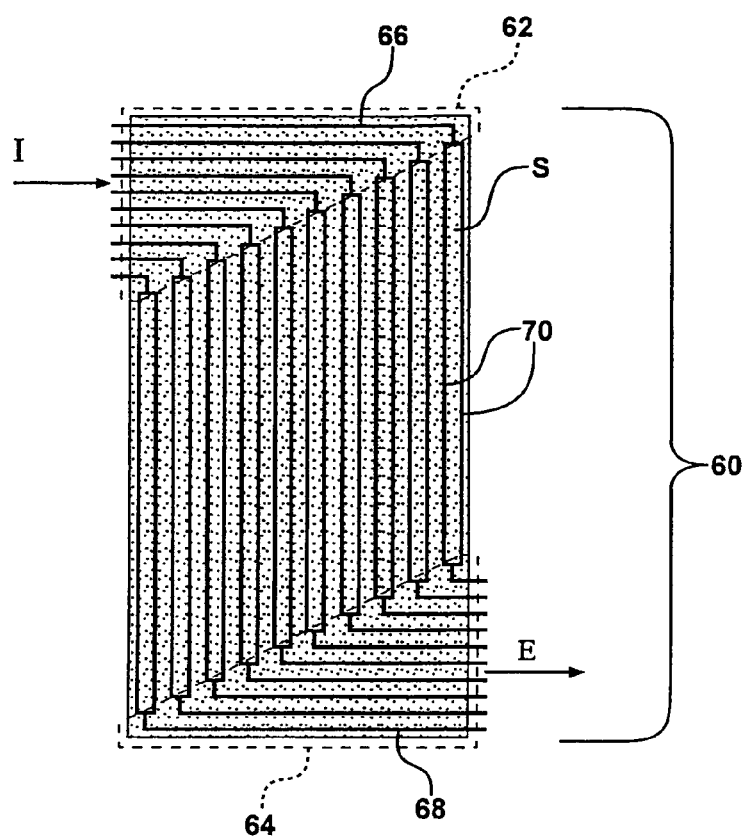
FIG. 2 is a schematic view of a flow field of an anode plate including branched flow according to the prior art.

FIG. 2 shows a flow field 60 of an anode plate (not shown) according to the prior art. The flow field 60 includes an inlet feed region 62 and an outlet feed region 64. A plurality of inlet flow channels 66 is formed in the inlet feed region 62 and a plurality of outlet flow channels 68 is formed in the outlet feed region 64. The inlet flow channels 66 are in communication with an anode inlet header (not shown), and the outlet flow channels 68 are in communication with an anode exhaust header (not shown). Each of the inlet flow channels 66 and the outlet flow channels 68 are in communication with a pair of intermediate branched flow channels 70. The flow channels 66, 68, 70 are adapted to provide a flow path from a source of an anode gas or fuel (not shown) to the exhaust header as indicated by the arrows I, E. An active region S is represented by the shaded area of the flow field 60.

In operation, the fuel is caused to flow into the flow field 60 through the inlet flow channels 66 from the source of fuel. When the fuel reaches the branched channels 70 downstream of the inlet feed region 62, the fuel flowing through the inlet flow channels 66 is divided into two branched channels 70. The fuel continues to flow through the branched channels 70 to the outlet flow channels 68 where the fuel is combined from two branched channels 70 into one of the outlet flow channels 68.

Figure 3:
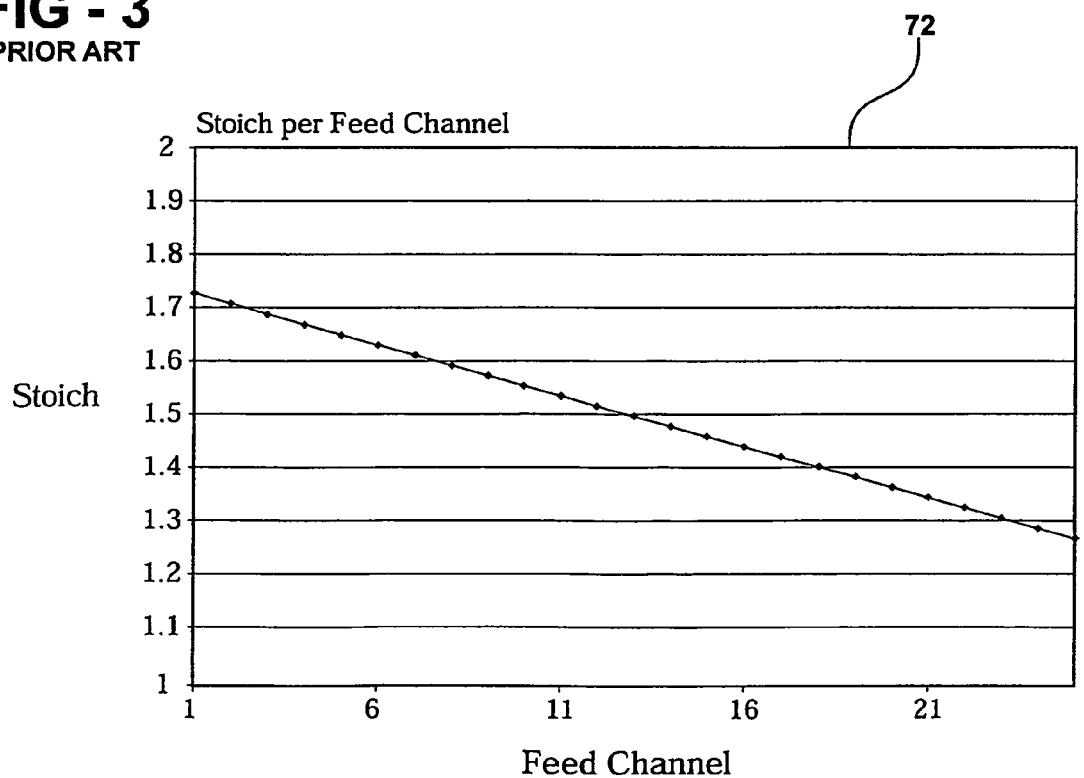
FIG. 3 is a graph showing an anode stoichiometry profile for the flow field of FIG. 2.

As is well known in the art, the fuel flows through the channels 66, 70, 68 in the active region S of the flow field 60 and is consumed during the chemical reaction resulting in the formation of water and electricity. Due to this consumption of fuel, the volume of fuel flowing from the anode exhaust header is less than the volume of fuel flowing to the anode inlet header. Therefore, a difference in the volumetric flow exists between the anode inlet header and the anode exhaust header. Since the inlet flow channels 66 differ in length from the outlet flow channels 68 communicating with the same branched channels 70, the difference between the volumetric flow at the anode inlet header and the anode exhaust header results in a higher pressure drop in the inlet flow channels 66 and a lower pressure drop in the outlet flow channels 68. This results in an uneven distribution of fuel between each of the individual flow channels 66, 70, 68 across the flow field 60. Consequently, some areas of the flow field 60 will have higher flows of fuel than other areas of the flow field 60. This uneven distribution of fuel in the flow field 60 is undesirable as anode stoichiometry distribution is affected. FIG. 3 is a graph 72 showing an anode stoichiometry profile for the flow field 60 of FIG. 1.

Figure 4:
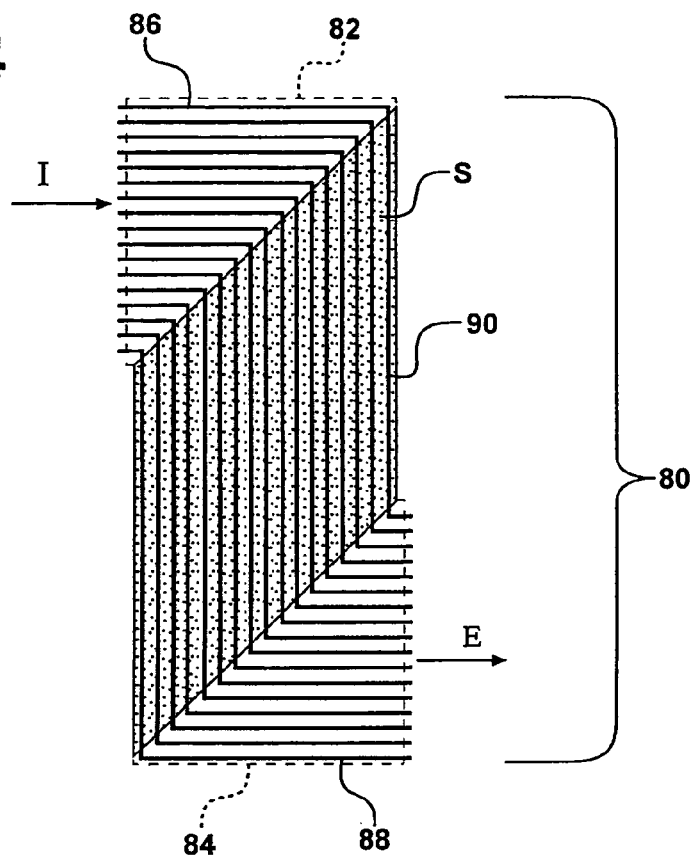
FIG. 4 is a schematic view of a flow field of an anode plate without branched flow according to the prior art.

FIG. 4 illustrates a flow field 80 of an anode plate (not shown) according to the prior art. The flow field 80 includes an inlet feed region 82 and an outlet feed region 84. A plurality of inlet flow channels 86 is formed in the inlet feed region 82 and a plurality of outlet flow channels 88 is formed in the outlet feed region 84. The inlet flow channels 86 are in communication with an anode inlet header (not shown), and the outlet flow channels 88 are in communication with an anode exhaust header (not shown). Each of the inlet flow channels 86 and the outlet flow channels 88 are in communication with an intermediate flow channel 90. The flow channels 86, 88, 90 are adapted to provide a flow path from a source of an anode gas or fuel (not shown) to the exhaust header as indicated by the arrows I, E. An active region S is represented by the shaded area of the flow field 80. The inlet feed region 82 and the outlet feed region 84 are located outside of the active region S and are non-active. Typically, where the inlet feed region 82 and the outlet feed region 84 are inactive, the diffusion media has not been added to these regions to permit nesting of plate halves to reduce the overall stack size of the fuel cell.

In operation, the fuel is caused to flow into the flow field 80 through the inlet flow channels 86 from the source of fuel. The fuel then flows through the intermediate channels 90 and through the outlet flow channels 88.

As is well known in the art, the fuel flows through the channels 90 in the active region S of the flow field 80 and is consumed. As described above for FIG. 2, the volume of fuel flowing from the anode exhaust header is less than the volume of fuel flowing to the anode inlet header, and a difference in the volumetric flow exists between the anode inlet header and the anode exhaust header. Additionally, both the lengths of each of the inlet flow channels 86 and the lengths of each of the outlet flow channels 88 are different. Due to the difference in length of the inlet flow channels 86 and the outlet flow channels 88, as well as the difference between the volumetric flow at the anode inlet header and the anode exhaust header, a difference in pressure drop between the inlet flow channels 86 and the outlet flow channels 88 exists. Thus, an uneven distribution of fuel between each of the individual flow channels 86, 90, 88 exists across the flow field 80. As a result, some areas of the flow field 80 will have higher flows of fuel than other areas of the flow field 80.

Figure 5:
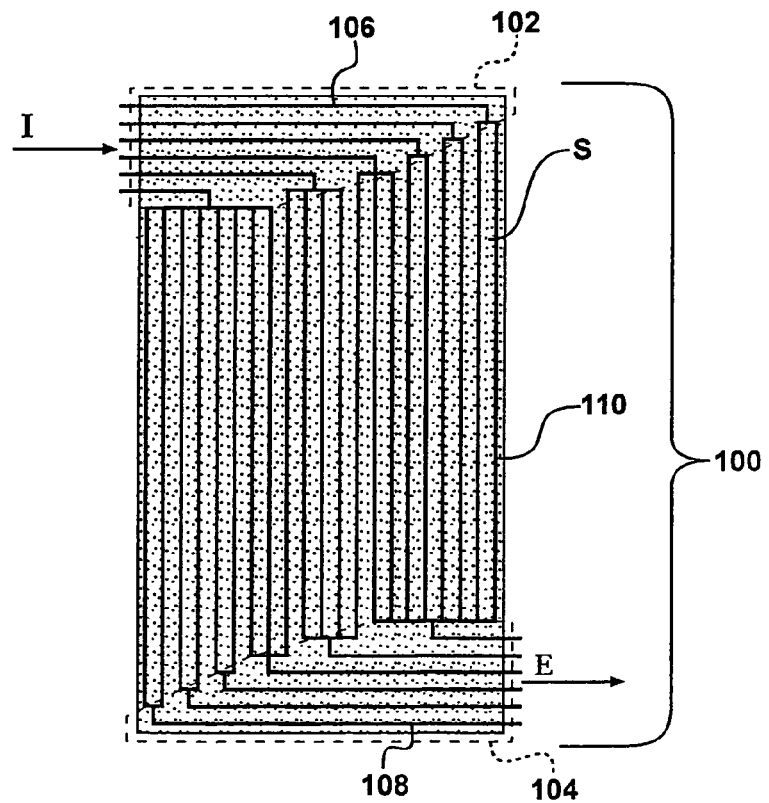
FIG. 5 is a schematic view of a flow field of an anode plate including branched flow according to an embodiment of the invention.

FIG. 5 illustrates a flow field 100 of an anode plate (not shown) according to an embodiment of the invention. The flow field 100 includes an inlet feed region 102 and an outlet feed region 104. A plurality of inlet flow channels 106 is formed in the inlet feed region 102 and a plurality of outlet flow channels 108 is formed in the outlet feed region 104. The inlet flow channels 106 are in communication with an anode inlet header (not shown), and the outlet flow channels 108 are in communication with an anode exhaust header (not shown).

Each of the inlet flow channels 106 and the outlet flow channels 108 are in communication with intermediate flow channels 110. In the embodiment shown, the inlet flow channels 106 and the outlet flow channels 108 communicate with a plurality of branched intermediate flow channels 110 between two and eight. It is understood that the inlet flow channels 106 and the outlet flow channels 108 can communicate with more or fewer intermediate flow channels 110 as desired. The flow channels 106, 108, 110 are adapted to provide a flow path from a source of an anode gas or fuel (not shown) to the exhaust header as indicated by the arrows I, E. An active region S is represented by the shaded area of the flow field 100, and encompasses the inlet region 106 and the outlet region 108. The active region S includes a diffusion medium adjacent those regions. It is understood that the inlet region 106 and the outlet region 108 can be located outside of the active region S, as will be described herein for other embodiments of the invention.

In operation, the fuel is caused to flow into the flow field 100 through the inlet flow channels 106 from the source of fuel. The fuel then flows through the intermediate channels 110 and through the outlet flow channels 108. As the fuel flows through the channels 106, 110, 108 in the active region S, the fuel is consumed. In order to compensate for the differences of the volume of fuel flowing through the anode inlet header and the anode exhaust header due to the consumption of the fuel, the number of intermediate flow channels 110 in communication with each of the inlet flow channels 106 and each of the outlet flow channels 108 is controlled.

In the inlet feed region 102, the volumetric flow is high. Thus, if the inlet flow channel 106 is relatively short, a larger number of intermediate flow channels 110 are in communication therewith. If the inlet flow channel 106 is relatively long, a smaller number of intermediate flow channels 110 are in communication therewith. In the outlet feed region 104, the volumetric flow is low. Thus, if the outlet flow channel 108 is relatively short, a larger number of intermediate flow channels 110 are in communication therewith. If the outlet flow channel 108 is relatively long, a smaller number of intermediate flow channels 110 are in communication therewith. This balances the pressure drop, and therefore the flow, across each of the inlet flow channels 106, the intermediate flow channels 110, and the outlet flow channels 108, thereby optimizing an anode stoichiometry distribution for the fuel cell.

In order to determine the correct balance, Equation 1 can be used:

$$dP = \frac{C\mu L vol}{2D_h^2 A} \qquad \text{Equation 1}$$

C is a constant, $\mu$ is viscosity, L is a length of the channel, vol is the volume flow, $D_h$ is the channel hydraulic diameter, and A is the channel cross-sectional area. This equation can also be used to get the same pressure drop between feed channels connected to different integer numbers of non-branched or active area channels. As an example, where the inlet flow channels 106 or the outlet flow channels 108 are of different lengths, the longer channels require proportionately less flow. Therefore, the volume flow required per channel according to Equation 1 would be adjusted inversely proportional to the length of the channels. Accordingly, fewer channels can be fed per feed channel for the longer channels. It is understood that the length of a feed channel could be increased by providing a non-direct path to achieve a desired feed channel length. It is also understood that although the configuration of the anode-inlet feed channels and the anode outlet feed channels can also be applied to the cathode feed channels, it is typically not necessary. The volume of the air used for the cathode reactant gas does not change as much as the hydrogen fuel because even though the oxygen is consumed from the air, most of the air used is non-reacting nitrogen.

Figure 6:
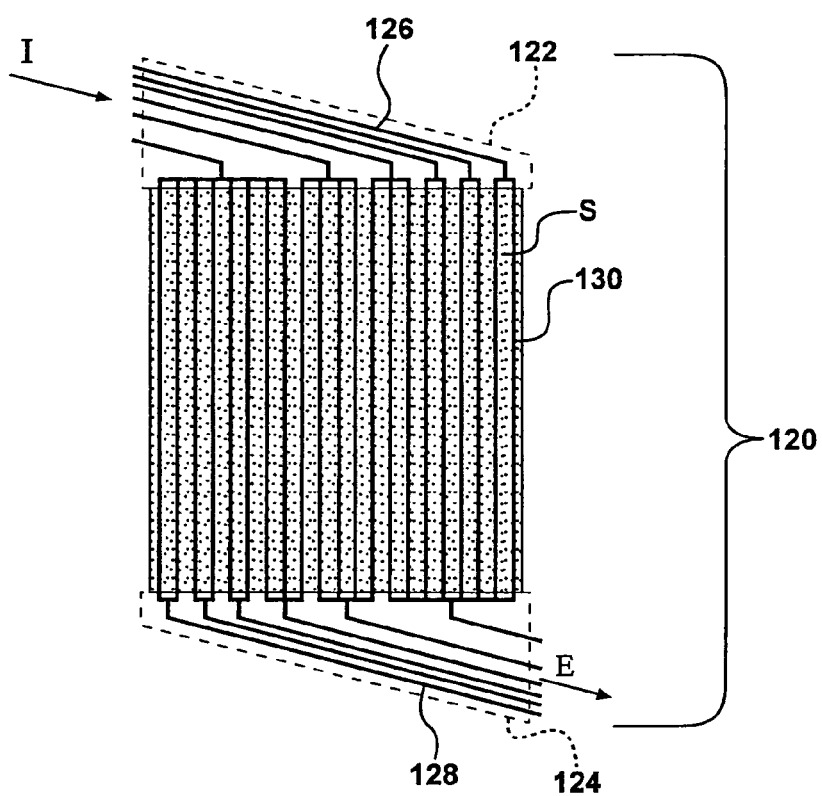
FIG. 6 is a schematic view of a flow field of an anode plate including branched flow according to another embodiment of the invention.

FIG. 6 illustrates a flow field 120 of an anode plate (not shown) according to another embodiment of the invention. The flow field 120 includes an inlet feed region 122 and an outlet feed region 124. A plurality of inlet flow channels 126 is formed in the inlet feed region 122 and a plurality of outlet flow channels 128 is formed in the outlet feed region 124. The inlet flow channels 126 are in communication with an anode inlet header (not shown), and the outlet flow channels 128 are in communication with an anode exhaust header (not shown).

Each of the inlet flow channels 126 and the outlet flow channels 128 are in communication with intermediate flow channels 130. In the embodiment shown, the inlet flow channels 126 and the outlet flow channels 128 communicate with a plurality of branched intermediate flow channels 130 between two and eight. It is understood that the inlet flow channels 126 and the outlet flow channels 128 can communicate with more or fewer intermediate flow channels 130 as desired. The flow channels 126, 128, 130 are adapted to provide a flow path from a source of an anode gas or fuel (not shown) to the exhaust header, as indicated by the arrows I, E. An active region S is represented by the shaded area of the flow field 120. The inlet feed region 122 and the outlet feed region 124 are located outside of the active region S, and are non-active. The active region S includes a diffusion medium adjacent thereto. Typically, where the inlet feed region 122 and the outlet feed region 124 are inactive, the diffusion media has not been added to these regions to permit nesting of plate halves to reduce the overall stack size of the fuel cell.

In operation, the fuel is caused to flow into the flow field 120 through the inlet flow channels 126 from the source of fuel. The fuel then flows through the intermediate channels 130 and the outlet flow channels 128. As the fuel flows through the intermediate flow channels 130 in the active region S, the fuel is consumed. In order to compensate for the differences of the volume of fuel flowing through the anode inlet header and the anode exhaust header due to the consumption of the fuel, the number of intermediate flow channels 130 in communication with each of the inlet flow channels 126 and each of the outlet flow channels 128 is controlled.

In the inlet feed region 122, the volumetric flow is high. Thus, if the inlet flow channel 126 is relatively short, a larger number of intermediate flow channels 130 are in communication therewith. If the inlet flow channel 126 is relatively long, a smaller number of intermediate flow channels 130 are in communication therewith. In the outlet feed region 124, the volumetric flow is low. Thus, if the outlet flow channel 128 is relatively short, a larger number of intermediate flow channels 130 are in communication therewith. If the outlet flow channel 128 is relatively long, a smaller number of intermediate flow channels 130 are in communication therewith. This balances the pressure drop, and therefore the flow, across each of the inlet flow channels 126, the intermediate flow channels 130, and the outlet flow channels 128, thereby optimizing an anode stoichiometry distribution for the fuel cell.

Figure 7:
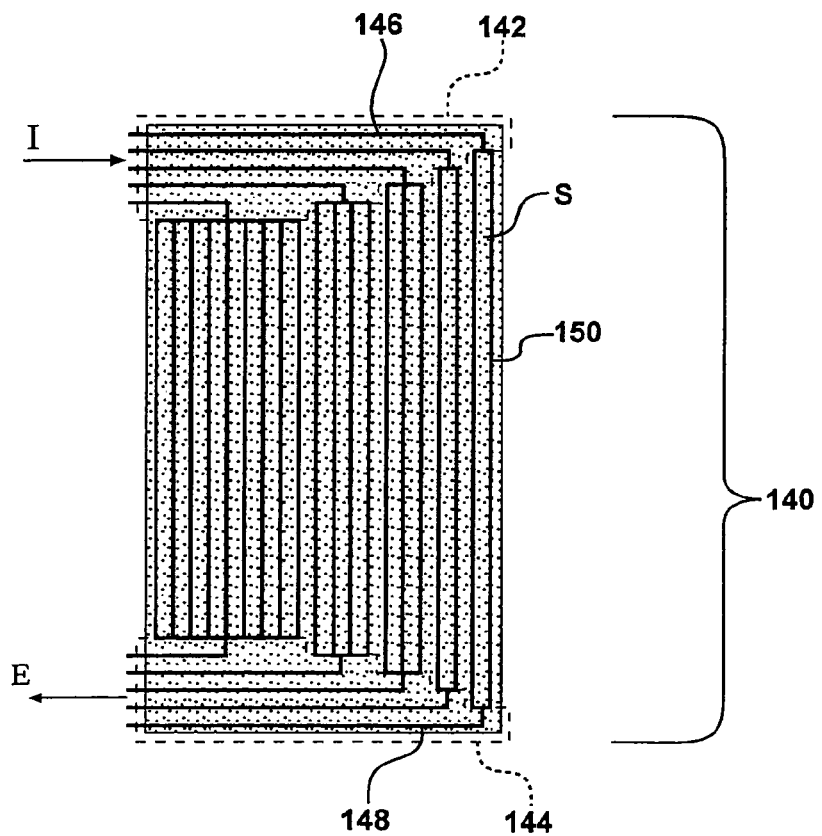
FIG. 7 is a schematic view of a flow field of an anode plate including branched flow according to another embodiment of the invention.

In FIG. 7, a flow field 140 of an anode plate (not shown) is illustrated according to another embodiment of the invention. The flow field 140 includes an inlet feed region 142 and an outlet feed region 144. A plurality of inlet flow channels 146 is formed in the inlet feed region 142 and a plurality of outlet flow channels 148 is formed in the outlet feed region 144. The inlet flow channels 146 are in communication with an anode inlet header (not shown), and the outlet flow channels 148 are in communication with an anode exhaust header (not shown).

Each of the inlet flow channels 146 and the outlet flow channels 148 are in communication with intermediate flow channels 150. As shown, the inlet flow channels 146 and the outlet flow channels 148 communicate with a plurality of branched intermediate flow channels 150 between two and nine. It is understood that the inlet flow channels 146 and the outlet flow channels 148 can communicate with more or fewer intermediate flow channels 150 as desired. The flow channels 146, 148, 150 are adapted to provide a flow path from a source of an anode gas or fuel (not shown) to the exhaust header, as indicated by the arrows I, E. An active region S is represented by the shaded area of the flow field 140, and encompasses the inlet region 146 and the outlet region 148. The active region S includes a diffusion medium adjacent those regions. It is understood that the inlet region 146 and the outlet region 148 can be located outside of the active region S, as previously described herein.

In operation, the fuel is caused to flow into the flow field 140 through the inlet flow channels 146 from the source of fuel. The fuel then flows through the intermediate channels 150 and the outlet flow channels 148. As the fuel flows through the channels 146, 150, 148 in the active region S, the fuel is consumed. In order to compensate for the differences of the volume of fuel flowing through the anode inlet header and the anode exhaust header due to the consumption of the fuel, the number of intermediate flow channels 150 in communication with each of the inlet flow channels 146 and each of the outlet flow channels 148 is controlled.

In the inlet feed region 142, the volumetric flow is high. Thus, if the inlet flow channel 146 is relatively short, a larger number of intermediate flow channels 150 are in communication therewith. If the inlet flow channel 146 is relatively long, a smaller number of intermediate flow channels 150 are in communication therewith. In the outlet feed region 144, the volumetric flow is low. Thus, if the outlet flow channel 148 is relatively short, a larger number of intermediate flow channels 150 are in communication therewith. If the outlet flow channel 148 is relatively long, a smaller number of intermediate flow channels 150 are in communication therewith. This balances the pressure drop, and therefore the flow, across each of the inlet flow channels 146, the intermediate flow channels 150, and the outlet flow channels 148, thereby optimizing an anode stoichiometry distribution for the fuel cell. For the inlet feed region 142 and the outlet feed region 144 orientation shown in FIG. 7, the intermediate flow channels 150 are of different lengths. The additional flow required for the longer intermediate flow channels 150 is taken into consideration by using Equation 1 to determine the desired pressure drop for each feed channel to balance the flow.

It is understood that the size (hydraulic diameter or area) of feed channels can be adjusted according to Equation 1 for each of the embodiments described herein to achieve the desired balance between feed channels. For example, in the embodiment shown in FIG. 7, a group of flow channels 146, 148 may connect to the same integer number of intermediate flow channels 150 as the flow channels are of different lengths. The size of longer flow channels 146, 148 of this group is increased compared to the shorter flow channels 146, 148 of this group. Also, as the flow channels 146, 148 connect to an integer number of intermediate channels, some adjustment of the flow channel 146, 148 sizes can be used to adjust to the same pressure drop as other flow channels 146, 148.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A plate for a fuel cell comprising:

a plate having a flow field formed therein, the flow field defined by a plurality of channels formed on an outer surface of the plate, the channels of the flow field adapted to provide communication between a source of gas and an exhaust header, the channels including a plurality of inlet flow channels in communication with the source of gas and formed in an inlet feed region of the plate, a plurality of outlet flow channels in communication with the exhaust header and formed in an outlet feed region of the plate, and a plurality of branched intermediate flow channels disposed adjacent a diffusion medium and formed in an active region of the plate, a first number of the branched intermediate flow channels in fluid communication with each of the inlet flow channels and a second number of the branched intermediate flow channels in fluid communication with each of the outlet flow channels, wherein the first number of the branched intermediate flow channels in fluid communication with each of the inlet flow channels is dependent upon a length of a one of the inlet flow channels with which the branched intermediate flow channels are in fluid communication, and independent of a length of the outlet flow channels with which the branched intermediate flow channels are in fluid communication, each of the inlet flow channels having a different length, the inlet flow channels having a relatively shorter length communicating with more branched intermediate flow channels than the inlet flow channels having a relatively longer length, and wherein the second number of the branched intermediate flow channels in fluid communication with each of the outlet flow channels is dependent upon a length of a one of the outlet flow channels with which the branched intermediate flow channels are in fluid communication, and independent of a length of the inlet flow channels with which the branched intermediate flow channels are in fluid communication, each of the outlet flow channels having a different length, the outlet flow channels having a relatively shorter length communicating with more branched intermediate flow channels than the outlet flow channels having a relatively longer length.

2. The plate according to claim 1, wherein the inlet feed region and the outlet feed region are inside of the active region.

3. The plate according to claim 1, wherein the inlet feed region and the outlet feed region are outside of the active region.

4. The plate according to claim 1, wherein the plate is an anode plate.

5. The plate according to claim 1, wherein at least one of the channels of the flow field has a hydraulic diameter different from a hydraulic diameter of the remaining channels.

* * * * *